United States Patent
Terao (10) Patent No.: US 11,182,022 B2
(45) Date of Patent: Nov. 23, 2021

(54) COORDINATE DETECTION METHOD, COORDINATE DETECTION PROGRAM, AND COORDINATE DETECTION SYSTEM

(71) Applicant: NEC Display Solutions, Ltd., Tokyo (JP)

(72) Inventor: Masayuki Terao, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 385 days.

(21) Appl. No.: 16/090,008

(22) PCT Filed: Apr. 4, 2016

(86) PCT No.: PCT/JP2016/061000
§ 371 (c)(1),
(2) Date: Sep. 28, 2018

(87) PCT Pub. No.: WO2017/175265
PCT Pub. Date: Oct. 12, 2017

(65) Prior Publication Data
US 2020/0319730 A1   Oct. 8, 2020

(51) Int. Cl.
*G06F 3/042* (2006.01)

(52) U.S. Cl.
CPC ............ *G06F 3/042* (2013.01); *G06F 3/0425* (2013.01)

(58) Field of Classification Search
CPC ...... G06F 3/042; G06F 3/0421; G06F 3/0425; G06F 1/1643
See application file for complete search history.

(56) References Cited

U.S. PATENT DOCUMENTS

| | | | | |
|---|---|---|---|---|
| 2012/0140319 A1* | 6/2012 | Moribe | .................. | G03B 17/54 359/460 |
| 2014/0085245 A1* | 3/2014 | Baldwin | ............... | G06F 3/0488 345/174 |
| 2016/0179245 A1* | 6/2016 | Johansson | ............. | G06F 3/0447 345/174 |
| 2018/0095596 A1* | 4/2018 | Turgeman | ............. | G06F 3/0416 |

FOREIGN PATENT DOCUMENTS

| | | | |
|---|---|---|---|
| CN | 103870233 A | | 6/2014 |
| JP | 2009-251827 A | | 10/2009 |
| JP | 2009251827 A | * | 10/2009 |
| JP | 2009-251827 A | * | 11/2009 |
| JP | 2012-027511 A | | 2/2012 |
| JP | 2012-118473 A | | 6/2012 |
| JP | 2015-052718 A | | 3/2015 |

OTHER PUBLICATIONS

International Search Report (ISR) (PCT Form PCT/ISA/210), in PCT/JP2016/061000, dated May 31, 2016.

* cited by examiner

Primary Examiner — Julie Anne Watko
(74) Attorney, Agent, or Firm — McGinn I.P. Law Group, PLLC.

(57) ABSTRACT

A coordinate detection system includes a camera configured to capture an image of a face opposite to a display face of a transmissive display panel including a plurality of luminous parts and to thereby produce video information, and a video processor configured to detect coordinates instructed on the display face of the transmissive display panel based on the luminance or chromaticity of reflected light, which occurs when reflecting light emitted from each luminous part of the transmissive display panel, according to the captured video information.

16 Claims, 6 Drawing Sheets

COORDINATE DETECTION METHOD, COORDINATE DETECTION PROGRAM, AND COORDINATE DETECTION SYSTEM

TECHNICAL FIELD

The present invention relates to a coordinate detection method, a coordinate detection program, and a coordinate detection system.

BACKGROUND ART

Due to recent commercialization of transmissive displays utilizing organic electroluminescence, transmissive displays are expected to be applied to window display/signage usage in windows due to the transmissive features thereof. For the purpose of signage, it is preferable to implement interactive functions using touch panels rather than simply displaying contents.

Large-size touch panel displays are generally known as the electrostatic-capacity type of displays or the infrared-ray type of displays (see Patent Literature Document 1).

CITATION LIST

Patent Literature Document

Patent Literature Document 1: Japanese Patent Application Publication No. 2015-52718

SUMMARY OF INVENTION

Technical Problem

Electrostatic-capacity type of displays may be damaged in terms of transparency (or transmissivity) due to electrodes attached to their surfaces. Infrared-ray type of displays may not be damaged in terms of transmissivity due to their display frames. However, the infrared-ray types of displays should be limited in the size and the shape of touch panels since display frames need to be positioned at operator sides (or surface sides).

A solving problem here is concerned with transmissive displays not requiring any structures (e.g. electrodes or display frames) at operator sides which are lacking in optimum systems to input instructions thereto.

That is, the present invention aims to provide a coordinate detection method or the like which can detect operator's instructions (including instructions using human touches) to transmissive displays while securing transmissivity in transmissive displays not requiring any structures at operator sides.

Solution to Problem

The present invention is directed to a coordinate detection method including a capture process for capturing an image of a face, which is furnished with a transmissive display panel configured to display a video and which is different from a display face for displaying the video, and a detection process for detecting coordinates instructed on the display face of the transmissive display panel based on the luminance or chromaticity of the reflected light, which occurs when reflecting light emitted from a luminous part of the transmissive display panel, according to the captured video information.

The present invention is directed to a coordinate detection program causing a computer to implement a capture process for capturing an image of a face, which is furnished with a transmissive display panel configured to display a video and which is different from a display face for displaying the video, and a detection process for detecting coordinates instructed on the display face of the transmissive display panel based on the luminance or chromaticity of the reflected light, which occurs when reflecting light emitted from a luminous part of the transmissive display panel, according to the captured video information.

The present invention is directed to a coordinate detection system including a camera configured to capture an image of a face, which is furnished with a transmissive display panel configured to display a video and which is different from a display face for displaying the video, and a video processor configured to detect coordinates instructed on the display face of the transmissive display panel based on the luminance or chromaticity of the reflected light, which occurs when reflecting light emitted from a luminous part of the transmissive display panel, according to the captured video information.

Advantageous Effects of Invention

The present invention is designed to capture an image of a face, which is furnished with a transmissive display panel configured to display a video and which is different from a display face for displaying the video and to thereby detect coordinates instructed on the display face of the transmissive display panel based on the luminance or the chromaticity of the reflected light, which occurs when reflecting the light emitted from a luminous part of the transmissive display panel, according to the captured video information. Thus, it is possible to provide a coordinate detection method configured to detect an operator's instruction to a transmissive display panel while securing its transmissivity without requiring any structures on the operator's side.

DESCRIPTION OF EMBODIMENTS

Figure 1:
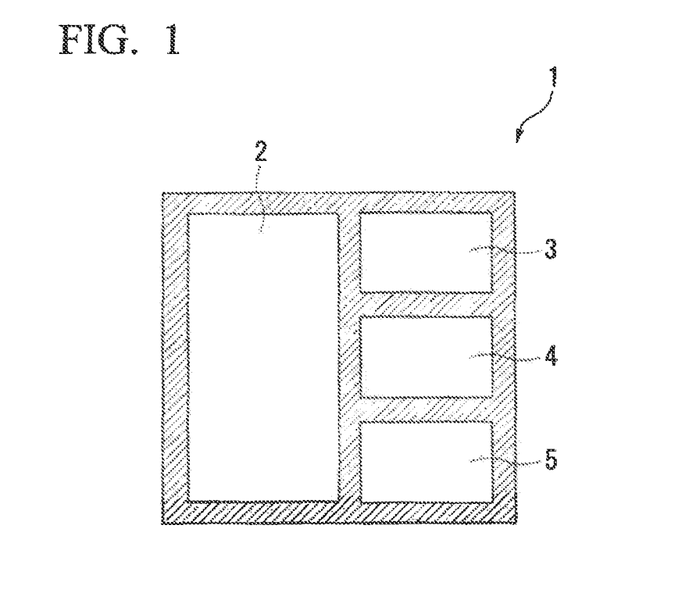
FIG. 1 is a schematic diagram showing a front view of a cell configuration used for a transmissive-type organic electroluminescence display according to the embodiment of the present invention.
Figure 2:
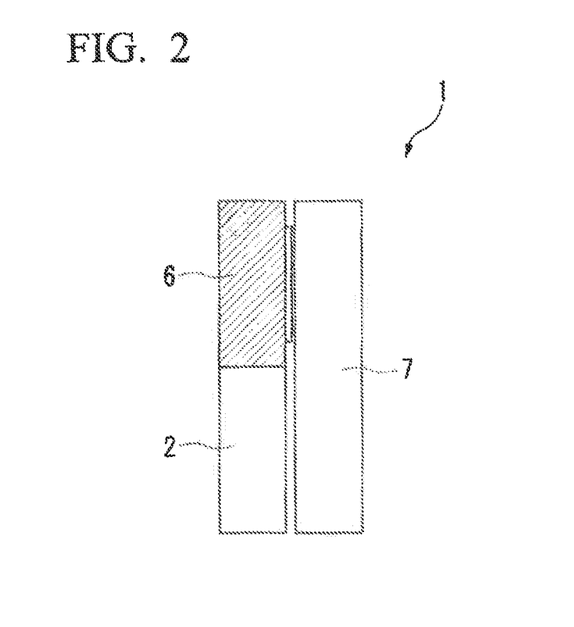
FIG. 2 is a schematic diagram showing a side view of a cell configuration used for a transmissive-type organic electroluminescence display according to the embodiment of the present invention.

Hereinafter, a detection system according to one embodiment of the present invention will be described with reference to the drawings. FIG. 1 is a schematic diagram showing a front view of each cell (or a spontaneous luminous element) used to form a transmissive-type organic electroluminescence display (or a transmissive display panel) according to the embodiment of the present invention. FIG. 2 is a schematic diagram showing a side view of a cell configuration used to form a transmissive-type organic electroluminescence display according to the embodiment of the present invention.

The transmissive-type organic electroluminescence display has a configuration for aligning a plurality of cells 1, corresponding to a plurality of pixels as shown in FIGS. 1 and 2, in a matrix. FIG. 1 shows the cell 1 viewed in its front side while FIG. 2 shows the cell 1 viewed in its lateral side.

As shown in FIG. 1, the cell 1 has a configuration including a transparent part 2 and a luminous part of RGB (i.e. an organic electroluminescence element including an R-luminous part 3, a G-luminous part 4, and B-luminous part 5).

The transparent part 2 occupies approximately a half area of the cell 1, wherein it is a part transparent enough to see through a front face, i.e. the opposite side (or the rear side). The R-luminous part 3 is a nontransparent part for spontaneously emitting red light toward the front face. The G-luminous part 4 is a nontransparent part for spontaneously emitting green light toward the front face. The B-luminous part 5 is a nontransparent part for spontaneously emitting blue light toward the front face.

Upon viewing the cell 1 in its lateral side, as shown in FIG. 2, a cover glass 7 is attached onto the transparent part 2 and a nontransparent part 6 (corresponding to the R-luminous part 3, the G-luminous part 4, and the B-luminous part 5 shown in FIG. 1).

Figure 3:
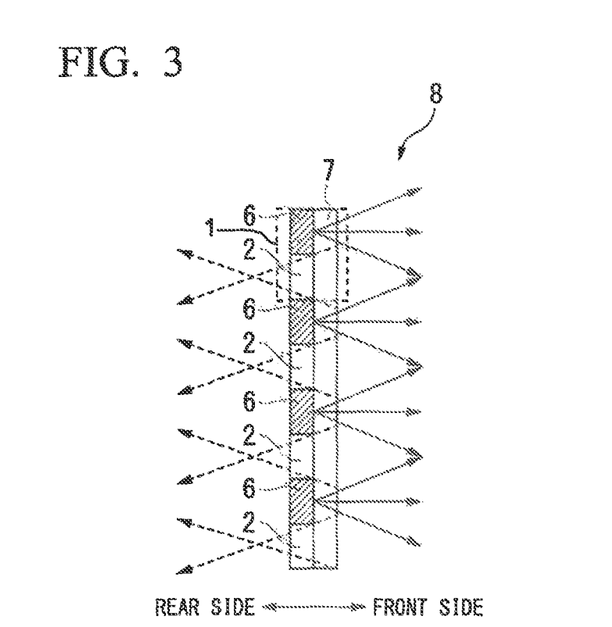
FIG. 3 is a schematic diagram showing a side view of cells reflecting light when an operator does not touch a transmissive-type organic electroluminescence display according to the embodiment of the present invention.
Figure 4:
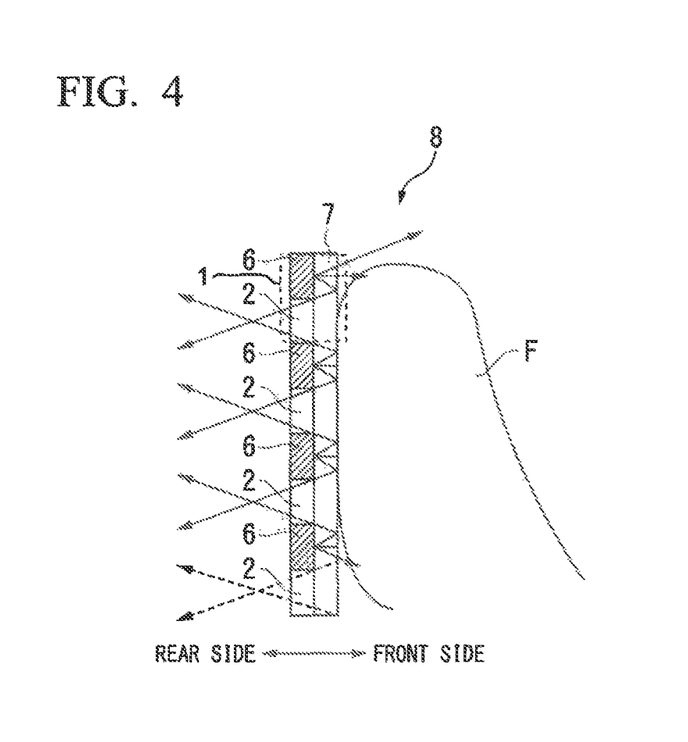
FIG. 4 is a schematic diagram showing a side view of cells reflecting light when an operator touches a transmissive-type organic electroluminescence display according to the embodiment of the present invention.

FIG. 3 is a schematic diagram showing a side view of cells reflecting light when an operator does not touch a transmissive-type organic electroluminescence display according to the embodiment of the present invention. FIG. 4 is a schematic diagram showing a side view of cells reflecting light when an operator touches a transmissive-type organic electroluminescence display according to the embodiment of the present invention. FIGS. 3 and 4 show the configuration of a transmissive-type electroluminescence display 8 in which a plurality of cells 1 each shown in FIGS. 1 and 2 are aligned in a matrix.

As shown in FIG. 3, most beams of light (denoted via solid lines) emitted from the nontransparent parts 6 are transmitted through the cover class 7 and then emitted to the front side, i.e. the operator side. Some beams of light (denoted via dashed lines) are reflected by the cover glass 7, transmitted through transparent parts 2, and then returned to the rear side.

As shown in FIG. 4, when an operator touches the surface of the cover glass 7 with his/her finger F, the reflectance at the touched part is changed, and therefore, a large number of beams of light are transmitted through the transparent parts 2 and then returned to the rear side.

Accordingly, organic electroluminescence displays do not need any backlights, which should be required by liquid crystal displays, and therefore, organic electroluminescence displays are display devices able to emit light spontaneously.

Figure 5:
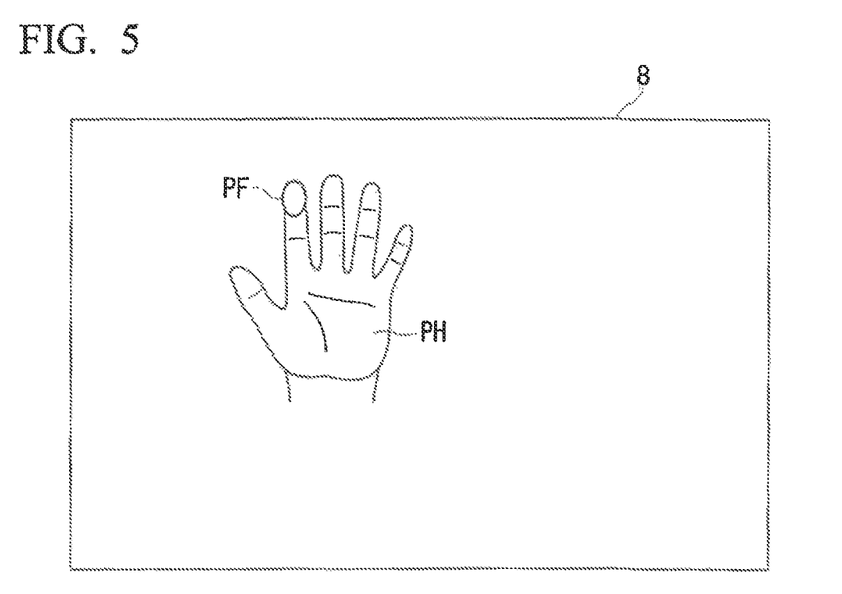
FIG. 5 is a schematic view showing the condition of a transmissive-type organic electroluminescence display viewed in its rear side according to the embodiment of the present invention.

FIG. 5 is a schematic view showing the condition of a transmissive-type organic electroluminescence display viewed in its rear side according to the embodiment of the present invention.

FIG. 5 shows the condition of the transmissive-type organic electroluminescence display 8 viewed in its rear side when an operator touches the surface of the cover glass 7 with his/her finger F as shown in FIG. 4. Through viewing the entirety of the transmissive-type organic electroluminescence display 8 as shown in FIG. 5, it is possible to observe that a finger-touched part PF seems to be solely bright with the human eye. A hand part PH other than the finger-touched part PF within an operator's hand can be viewed in a different face than the surface through the transparent parts 2 of the transmissive-type organic electroluminescence display 8. The present embodiment refers to a method allowing an operator (or a person) to touch a transmissive-type organic electroluminescence display as one example of methods for making instructions (or inputs) to transmissive-type organic electroluminescence displays; hence, other instruction methods can be used. Other than a method of making instructions using fingers directly touching transmissive-type organic electroluminescence displays, for example, it is possible to provide a method of making instructions using any input devices (e.g. touch pens) with transmissive-type organic electroluminescence displays or a method of making instructions using fingers which are moved closer to transmissive-type organic electroluminescence displays to cause reflected light.

Figure 6:
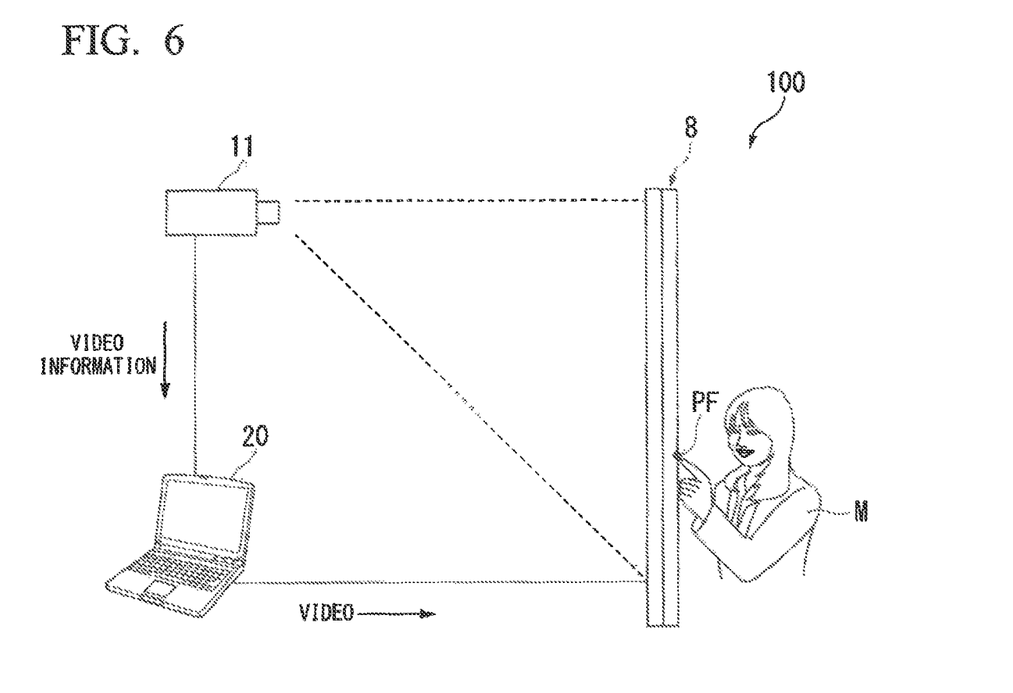
FIG. 6 is a schematic view used to explain features of a detection system according to the present embodiment.

FIG. 6 is a schematic view used to explain the features of a detection system according to the present embodiment. A detection system 100 includes the transmissive-type organic electroluminescence display 8 (or a display device), a camera 11, and a PC 20.

The camera 11 captures an image of the transmissive-type organic electroluminescence display 8 (or a video display) in its rear side, i.e. a different face of the transmissive-type organic electroluminescence display 8 for displaying videos than its surface for displaying videos.

The PC (Personal Computer) 20 includes a video processor having a video processing function. The video processor extracts from the video information taken by the camera 11 the brightened part PF touched by an operator M by way of image processing, and then, calculates the position of XY coordinates (touch coordinate information) at the part PF on the surface based on the extraction result. Herein, the video processor detects coordinates based on the luminance or chromaticity of the reflected light, which is acquired from the video information taken by the camera 11 and which occurs when reflecting light emitted from luminous parts of the transmissive-type organic electroluminescence display 8.

The PC 20 includes a controller configured to carry out control operations such as changing videos displayed on screen or implementing predetermined operations based on the touch coordinate information from the video processor.

The PC 20 further includes a video output part configured to output videos according to instructions from the controller.

The transmissive-type organic electroluminescence display 8 displays videos output from the video output part.

As described above, the detection system 100 is designed to capture an image of the transmissive-type organic electroluminescence display 8 in its rear face and to thereby detect coordinates based on the luminance or chromaticity of the reflected light from the video information via image capturing. For this reason, it is possible to provide a detection method for detecting an operator's touch (or his/her instruction) while securing transmissivity of the transmissive-type organic electroluminescence display 8 not requiring any structures at the operator's side.

First Embodiment

Figure 7:
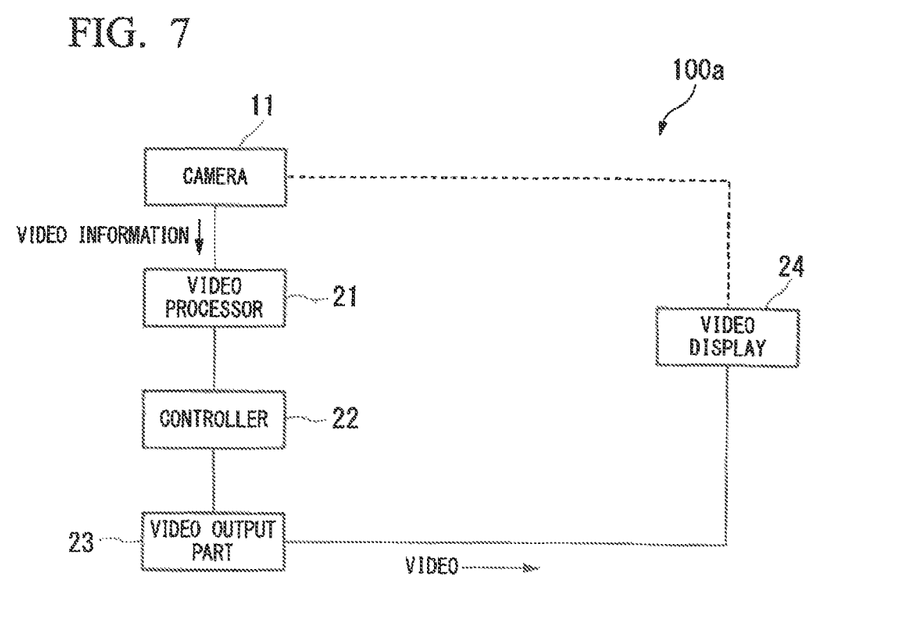
FIG. 7 is a block diagram showing the configuration of a detection system according to the first embodiment of the present invention.

FIG. 7 is a block diagram showing the configuration of a detection system according to the first embodiment of the present invention.

A detection system 100a includes the camera 11, a video processor 21, a controller 22, a video output part 23, and a video display 24.

The camera 11 captures an image of the video display 24 in its rear face and thereby sends the video information to the video processor 21.

The video processor 21 extracts from the video information from the camera 11 the brightened part PF touched by an operator by way of image processing, and then, calculates the position of XY coordinates (or touch coordinate information) of the part PF on the surface based on the extraction result. Herein, the video processor 21 detects coordinates based on the luminance or chromaticity of the reflected light which is acquired from the video information captured by the camera 11.

Specifically, the video processor 21 determines that an operator's touch is made on the surface on the condition (or a first condition) that a difference of luminance between a frame before being touched by an operator and a frame after being touched by an operator exceeds a preset threshold. That is, the video processor 21 determines the existence/nonexistence of an instruction by determining whether or not a difference of luminance, which is calculated as a difference of luminance regarding the reflected light between a previous frame before an instruction and a subsequent frame after an instruction, exceeds a threshold.

In addition, the video processor 21 calculates the position of XY coordinates at the touched part when it is determined that a touch operation is made on the surface, and thereafter notifies the controller 22 of its calculation result as touch coordinate information.

The controller 22 is able to carry out control operations such as changing a video displayed on screen or implementing predetermined operations based on the touch coordinate information from the video processor 21. Specifically, the controller 22 carries out the aforementioned control operations when the touch coordinate information matches the coordinate information of an instruction button (or a video subjected to detection) displayed on the video display 24. The video output part 23 outputs videos on the video display 24 according to instructions from the controller 22. The video display 24 displays videos output from the controller 22.

Figure 8:
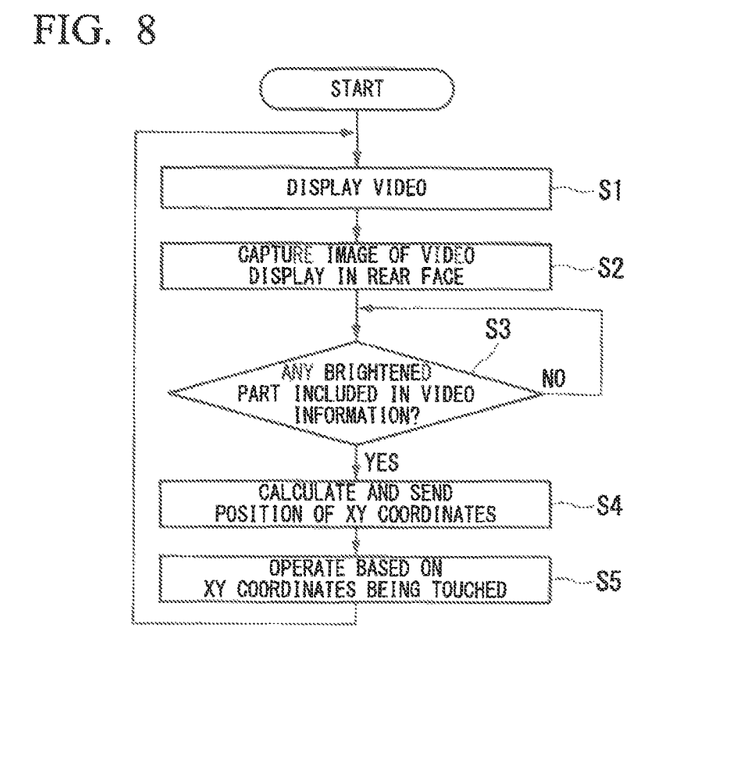
FIG. 8 is a flowchart showing the procedures of the detection system shown in FIG. 7.

FIG. 8 is a flowchart showing the processing of the detection system 100a shown in FIG. 7.

The video display 24 displays videos (step ST1). Specifically, the video display 24 displays videos output from the video output part 23. The camera 11 captures an image of the video display 24 in its rear face (step ST2). Specifically, the camera 11 captures an image of the video display 24 in its rear face and thereby sends the video information to the video processor 21 continuously.

The video processor 21 determines whether or not any brightened parts are included in the video information sent from the camera 11 (step ST3). The video processor 21 determines that an operator's touch is made on the surface upon satisfying the first condition. That is, the video processor 21 determines that an operator's touch is made on the surface on the condition (i.e. the first condition) that a difference of luminance, which is calculated between a frame before being touched by an operator and a frame after being touched by an operator, exceeds the predetermined threshold.

The video processor 21 calculates and sends the position of XY coordinates (step ST4). That is, the video processor 21 calculates the position of XY coordinates at the touched part when it is determined that a touch operation is made on the surface (step ST3—yes), and thereafter notifies the controller 22 of the calculation result as the touch coordinate information.

The controller 22 operates based on the XY coordinates of the touched position (i.e. touch coordinates) (step ST5). That is, the controller 22 carries out control operations such as changing videos displayed on screen and implementing predetermined operations based on the touch coordinate information from the video processor 21. Specifically, the controller 22 carries out the aforementioned control operations when the touch coordinate information matches the coordinate information of an instruction button displayed on the video display 24.

The present embodiment is designed to capture an image of the video display 24 in its rear face and to thereby detect coordinates based on the luminance of the reflected light obtained by the video processor 21 from the video information captured by the camera 11. For this reason, it is possible to provide a detection method for detecting an operator's touch (or his/her instruction) while securing transmissivity of the video display 24 not requiring any structures at the operator side.

Second Embodiment

Figure 9:
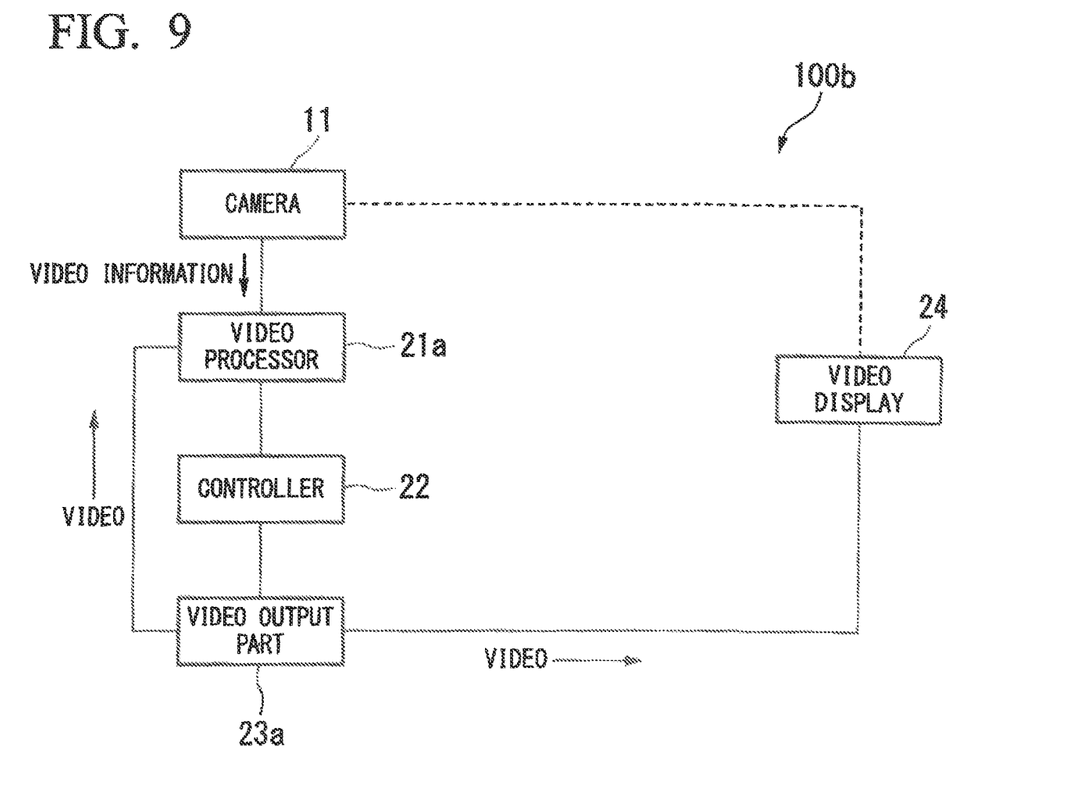
FIG. 9 is a block diagram showing the configuration of a detection system according to the second embodiment of the present invention.

FIG. 9 is a block diagram showing the configuration of a detection system according to the second embodiment of the present invention.

A detection system 100b includes the camera 11, a video processor 21a, the controller 22, a video output part 23a, and the video display 24.

The configuration of the detection system 100b is substantially identical to the configuration of the detection system 100 according to the first embodiment, but they differ from each other in terms of the following points.

That is, the second embodiment differs from the first embodiment in terms of a feedback from the video output part 23a to the video processor 21a. That is, a video from the video output part 23a is supplied to the video processor 21a in addition to the video display 24.

The camera 11 captures an image of the video display 23 in its rear face and thereby sends the video information to the video processor 21a.

The video processor 21a extracts from the video information of the camera 11 the brightened part PF touched by an operator by way of image processing, and thereafter calculates the position of XY coordinates (i.e. touch coordinate information) at the part PF on the surface according to the extraction result. Herein, the video processor 21a detects coordinates based on the luminance or chromaticity of the reflected light which is acquired from the video information captured by the camera 11.

Specifically, the video processor 21a determines that the video information becomes bright on the condition (or the first condition) that a difference of luminance between a frame before being touched by an operator and a frame after being touched by an operator exceeds a predetermined threshold. However, the window display may have a possibility of receiving ambient light, e.g. headlight of a car as disturbance light when the window display is located along a road. Upon detecting the brightened part, the video processor 21a determines whether the brightened part matches the video input from the video output part 23a at the same position in terms of chromaticity. Accordingly, the video processor 21a determines that an operator's touch is made on the surface by assuming that the brightened part touched by an operator would be brightened by its reflected light on the condition (i.e. a second condition) that the brightened part matches the input video in terms of the chromaticity. In contrast, when the brightened part differs from the input video in terms of the chromaticity, it is possible to determine that an operator's touch is not made on the surface by assuming that the brightened part would be brightened due to disturbance light. In addition, the video processor 21a calculates the position of XY coordinates at the touched part upon determining that an operator's touch is made on the surface, and thereafter notifies the controller 22 of the calculation result as touch coordinate information.

The controller 22 carries out control operations such as changing videos displayed on screen and implementing predetermined operations based on the touch coordinate information from the video processor 21a. Specifically, the controller 22 carries out the aforementioned control operations when the touch coordinate information matches the coordinate information of an instruction button displayed on the video display 24.

The video output part 23a outputs videos to the video display 24 according to instructions of the controller 22. In addition, the video output part 23a outputs videos to the video processor 21a such that the video processor 21a can calculate the touch coordinate information. The video display 24 displays videos output from the video output part 23.

Figure 10:
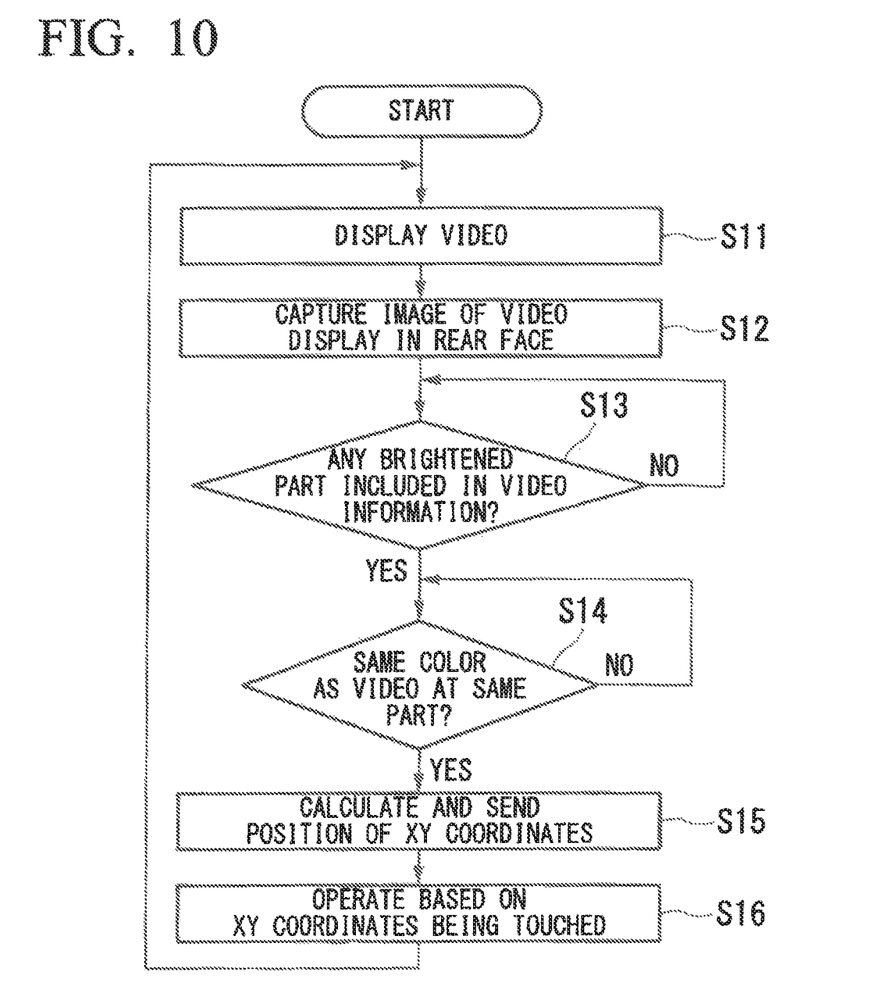
FIG. 10 is a flowchart showing the procedures the detection system shown in FIG. 9.

FIG. 10 is a flowchart showing the procedures of the detection system shown in FIG. 9.

The video display 24 displays videos on screen (step ST11). Specifically, the video display 24 displays videos output from the video output part 23a.

The camera 11 captures an image of the video display 24 in its rear face (step ST12). Specifically, the camera 11 captures an image of the video display 24 in its rear face and thereby sends the video information to the video processor 21a continuously.

The video processor 21a determines whether or not any brightened parts are included in the video information sent by the camera 11 (step ST13). The video processor 21a determines that an operator's touch is made on the surface upon satisfying the first condition. That is, the video processor 21a determines that the video information includes any brightened parts on the condition (i.e. the first condition) that a difference of luminance between a frame before being touched by an operator and a frame after being touched by an operator exceeds a preset threshold.

The video processor 21a determines whether the same color is applied to the brightened part and its corresponding part included in a video output from the video output part 23a (step ST14). Specifically, upon detecting the brightened part (step ST13—yes), the video processor 21a determines whether or not the brightened part matches the video input from the video output part 23a at the same position in terms of the chromaticity. Accordingly, the video processor 21a determines that an operator's touch is made on the surface by assuming that the brightened part touched by an operator would be brightened due to the reflected light at the same position on the condition (i.e. the second condition) that the brightened part has the same chromaticity as the input video.

The video processor 21a calculates the position of XY coordinates and thereby sends it to the controller 22 (step ST15). Upon determining that an operator's touch is made on the surface (step ST14—yes), the video processor 21a calculates the position of XY coordinates at the touched part, and thereafter notifies the controller 22 of the calculation result as the touch coordinate information.

The controller 22 operates based on the XY coordinates of the touched part (or touch coordinates) (step ST16). That is, the controller 22 carries out control operations such as changing videos displayed on screen and implementing predetermined operations based on the touch coordinate information from the video processor 21a. Specifically, the controller 22 carries out the aforementioned control operations when the touch coordinate information matches the coordinate information of an instruction button displayed on the video display 24.

The present embodiment is designed to capture an image of the video display 24 in its rear face and to thereby detect coordinates based on the luminance and the chromaticity of the reflected light which the video processor 21a acquires from the video information captured by the camera 11, and therefore, it is possible to secure transmissivity using the light displayed on screen without being affected by disturbance light. Accordingly, it is possible to provide a detection method configured to detect an operator's touch (or his/her instruction) while securing the transmissivity of a transmissive display not requiring any structures at the operator's side.

The preferred embodiments of the present invention have been described above; however, the present invention is not necessarily limited to the foregoing embodiments and their variations. Therefore, it is possible to add, omit, and replace constituent elements and to make any other changes without departing from the subject matter of the invention.

For example, the second embodiment refers to a configuration for determining that an operator's touch is made on the surface when a difference of luminance regarding the reflected light, which is calculated between a frame before being touched by an operator and a frame after being touched by an operator, exceeds the preset threshold and when the chromaticity of the reflected light matches the chromaticity of a video representing an instruction button output on the surface. It is possible to replace the above configuration with a configuration for determining that an operator's touch is made on the surface when a difference of luminance regarding the reflected light, which is calculated between a frame before being touched by an operator and a frame after being touched by an operator, exceeds the preset threshold and when the captured video information includes a video representing an operator (or a person). Accordingly, it is possible to preclude the disturbance light.

In this connection, it is possible to discriminate an operator from another person included in a video displayed on screen because the video is displayed by means of the video output part.

The foregoing embodiments are described with respect to a single instruction button displayed on screen; however, it is possible to provide a multi-touch configuration using a plurality of instruction buttons.

In addition, the foregoing embodiments are described with respect to a single operator; however, they can be adapted to a plurality of operators.

Moreover, the foregoing embodiments are described with respect to the configuration of a transmissive-type organic electroluminescence display configured to display videos on its front face among its front and rear faces; however, the display can be reconfigured to display videos on both faces thereof.

It is possible to store detection programs, which achieve the function of the detection system 100, 100*a*, or 100*b* on computer-readable storage media, to load programs, which are stored on storage media, to a computer system, and to thereby execute programs, thus realizing a capture process made by a camera and a detection process made by a video processor. In this connection, the term "computer system" may embrace OS and hardware such as peripheral devices.

In addition, the term "computer system" using a WWW system may embrace homepage-providing environments (or displaying environments).

The term "computer-readable storage media" may embrace flexible disks, magneto-optical disks, ROM, portable media such as CD-ROM, storage devices such as hard disks embedded in computer systems. Moreover, the term "computer-readable storage media" may embrace any measures configured to hold programs for a certain period of time such as a volatile memory (RAM) inside computer systems serving as servers and clients operating on programs transmitted thereto through networks such as the Internet and communication lines such as telephone lines. The aforementioned programs may achieve part of the foregoing functions; alternatively, they may achieve the foregoing functions when combined with pre-installed programs already stored on computer systems.

INDUSTRIAL APPLICABILITY

The present invention is characterized by capturing an image of a display device in its rear face and thereby detecting coordinates based on the luminance or chromaticity of the reflected light acquired from the captured video information. Accordingly, it is possible to provide a detection method for detecting an operator's touch (or his/her instruction) while securing transmissivity of a transmissive display not requiring any structures at the operator's side.

REFERENCE SIGNS LIST

1 cell
2 transparent part
3 R-luminous part
4 G-luminous part
5 B-luminous part
6 nontransparent part
7 cover glass
8 transmissive-type organic electroluminescence display
11 camera
21, 21*a* video processor
22 controller
23, 23*a* video output part
24 video display
20 PC
100, 100*a*, 100*b* detection system

The invention claimed is:

1. A coordinate detection method, comprising:
capturing images of a face opposite to a display face of a transmissive display panel including a plurality of luminous parts and thereby producing video information; and
detecting coordinates instructed on the display face of the transmissive display panel based on a chromaticity of reflected light, which occurs when reflecting light emitted from each luminous part of the transmissive display panel, according to the video information,
wherein, upon detecting the coordinates, a difference of a luminance of the reflected light between a frame, in a first state that an object is before being touched with a display screen, and a frame in a second state that the object is in touch with the display screen so that the display light from the display screen is reflected by the object resulting in a certain amount of the reflection light, is calculated according to the video information and the existence/nonexistence of an instruction is determined by determining whether or not the difference exceeds a threshold.

2. The coordinate detection method according to claim 1, wherein, upon detecting the coordinates, the difference of the luminance of the reflected light between the frame before being instructed and the frame after being instructed is calculated according to the video information and the existence of the instruction is determined by determining whether or not the difference exceeds the threshold when the chromaticity of the reflected light matches chromaticity of a video object being outputted on the display face.

3. The coordinate detection method according to claim 1, wherein, upon detecting the coordinates, the difference of the luminance of the reflected light between the frame before being instructed and the frame after being instructed is calculated according to the video information and the existence of an instruction is determined by determining whether or not the difference exceeds the threshold when the video information includes a video of a person.

4. The coordinate detection method according to claim 1, wherein a video output on the display face includes a plurality of video objects.

5. The coordinate detection method according to claim 1, wherein the plurality of luminous parts of the transmissive display panel include a plurality of organic electroluminescence elements.

6. The coordinate detection method according to claim 1, further comprising:
detecting the luminance of reflected light; and
detecting the chromaticity of reflected light,
wherein the detecting of the coordinates is based on the luminance of reflected light and the chromaticity of reflected light.

7. The coordinate detection method according to claim 1, wherein the object includes an operator's finger.

8. The coordinate detection method according to claim 1, wherein the object includes a touch pen.

9. A non-transitory computer-readable storage medium having stored a coordinate detection program causing a computer to implement:
capturing images of a face opposite to a display face of a transmissive display panel including a plurality of luminous parts and thereby producing video information; and
detecting coordinates instructed on the display face of the transmissive display panel based on a chromaticity of reflected light, which occurs when reflecting light emitted from each luminous part of the transmissive display panel, according to the video information, wherein, upon detecting the coordinates, a difference of a luminance of the reflected light between a frame, in a first state that an object is before being touched with a display screen, and a frame in a second state that the object is in touch with the display screen so that the display light from the display screen is reflected by the object resulting in a certain amount of the reflection light, is calculated according to the video information and the existence/nonexistence of an instruction is determined by determining whether or not the difference exceeds a threshold.

10. The non-transitory computer-readable storage medium according to claim 9, wherein the program further causes the computer to implement:

detecting the luminance of reflected light; and detecting the chromaticity of reflected light; and wherein the detecting of the coordinates is based on the luminance of reflected light and the chromaticity of reflected light.

11. The non-transitory computer-readable storage medium according to claim 9, wherein the object includes an operator's finger.

12. The non-transitory computer-readable storage medium according to claim 9, wherein the object includes a touch pen.

13. A coordinate detection system, comprising:

a camera configured to capture images of a face opposite to a display face of a transmissive display panel including a plurality of luminous parts and to thereby produce video information; and a video processor configured to detect coordinates instructed on the display face of the transmissive display panel based on a chromaticity of reflected light, which occurs when reflecting light emitted from each luminous part of the transmissive display panel, according to the video information, wherein, when the video processor detects the coordinates, a difference of a luminance of the reflected light between a frame, in a first state that an object is before being touched with a display screen, and a frame in a second state that the object is in touch with the display screen so that the display light from the display screen is reflected by the object resulting in a certain amount of the reflection light, is calculated according to the video information and the existence/nonexistence of an instruction is determined by determining whether or not the difference exceeds a threshold.

14. The coordinate detection system according to claim 13, wherein the video processor is further configured to:

detect the luminance of reflected light; and detect the chromaticity of reflected light, and wherein the video processor detects the coordinates based on the luminance of reflected light and the chromaticity of reflected light.

15. The coordinate detection system according to claim 13, wherein the object includes an operator's finger.

16. The coordinate detection system according to claim 13, wherein the object includes a touch pen.

* * * * *